United States Patent [19]
Bourdelais

[11] Patent Number: 6,058,075
[45] Date of Patent: May 2, 2000

[54] SYSTEM FOR CANCELING INTERFERERS FROM BROADBAND ACTIVE SONAR SIGNALS USING ADAPTIVE BEAMFORMING METHODS

[75] Inventor: John M Bourdelais, Oakton, Va.

[73] Assignee: GTE Internetworking Incorporated, Burlington, Mass.

[21] Appl. No.: 09/263,437

[22] Filed: Mar. 4, 1999

Related U.S. Application Data

[60] Provisional application No. 60/077,354, Mar. 9, 1998.

[51] Int. Cl.$^7$ ...................................................... G01S 15/00
[52] U.S. Cl. .......................... 367/103; 367/119; 367/905
[58] Field of Search ................................... 367/103, 119, 367/905

[56] References Cited

PUBLICATIONS

Anderson, V.C., Rudnick, P., "Rejection of a Coherent Arrival at an Array", JASA vol. 45, pp. 406–410, 1969.
Anderson, V.C., "DICANNE, a Realizable Adaptive Process", JASA vol. 45, pp. 398–405, 1969.
Anderson, V.C., "Side Lobe Interference Suppression with an Adaptive Null Processor", JASA vol. 69, pp. 185–190, 1981.
Cox, H., Zeskind, R., Owen, M., "Robust Adaptive Beamforming", IEEE Trans. ASSP, vol. ASSP–35, No. 10, pp. 1365–1376, 1987.
Hudson, J.E., "Adaptive Array Principles", New York: Peter Peregrinus for IEE, 1981, pp. 59–81.
Monzingo, R.A., Miller, T.W., "Introduction to Adaptive Arrays", New York: Wiley & Sons, pp. 293–313, 1980.
Owlsey, N., Abraham, D.A., "Beamforming with Dominant Mode Rejection", CH2858–9/90/0000–0470 IEEE, 1990.
Owsley, N., "Enhanced Minimum Variance Beamforming", in Underwater Acoustic Data Processing, Ed. Y.T. Chan, Kluwer Academic Publishers, 1989.
Vural, A.M., "A Comparative Performance Study of Adaptive Array Processors", IEEE ICASSP 1977 Rec. May 1977, pp. 695–700.
Adams, S.L., Nolte, L.W., "Bayes Optimum Array Detection of Targets of Known Location", J. Acoust. Soc. Am., vol. 58, No. 3, pp. 656–669, Sep. 1975.

*Primary Examiner*—Ian J. Lobo
*Attorney, Agent, or Firm*—Leonard Charles Suchyta; Floyd E. Anderson

[57] ABSTRACT

An adaptive beamforming system for broadband sonar with a convergence time on the order of the pulse duration and effective interference nulling capabilities which enhance desirable echoes. The method uses an element based time implementation algorithm in which beam data that is formed in the direction of each interferer is successively subtracted from the element data using an adaptive FIR filter. The system can be applied to impulsive source sonar data and passive sonar data.

14 Claims, 4 Drawing Sheets

SYSTEM FOR CANCELING INTERFERERS FROM BROADBAND ACTIVE SONAR SIGNALS USING ADAPTIVE BEAMFORMING METHODS

RELATED APPLICATIONS

This application is related to and claims the benefit of the filing date of U.S. provisional application, Ser. No. 60/077,354, filed Mar. 9, 1998, which is hereby incorporated by reference.

GOVERNMENT CONTRACTS

The U.S. Government has a paid-up license in this invention and the right in limited circumstances to require the patent owner to license others on reasonable terms as provided for by the terms of the following contract: N00014-93-C-0203

BACKGROUND OF THE INVENTION

1. Field of the Invention

This invention is directed to a method for canceling interferers in a signal using adaptive beamforming, and more specifically to a method of canceling interferers in a broadband active sonar signal using adaptive beamforming.

2. Description of Related Art

Active sonar operates by transmitting a pulse of energy that reflects from targets to a receiver. The receiver may be located proximate the transmitter or may be distant from the transmitter, and more than one receiver can be connected to form an array. The signal received by the receivers includes the reflected pulse of energy, but unwanted returns can also be received in the form of volume reverberation and echoes reflected from the sea bottom and from the water surface. In addition, nearby shipping noise and other sources of underwater noise may be received together with the signal of interest, and could prevent the detection of the desired signal.

A configuration using multiple receivers separated by a certain distance from each other, called an array, can be used to filter out unwanted noise. Since the receivers are separated in space, a signal reaches each different receiver at a different time. The time of arrival is thus dependent on the direction from which the signal originates. For example, if the signal originates from a direction perpendicular to the line of receivers, all the receivers will first receive the signal at the same time. If the signal originates from a direction left of the line of receivers, all the signal will be detected by receiver 1 (the left most receiver) before being detected by the rest of the receivers, this time delay of reception being a function of the signal direction of origin. If one is interested in determining information about a signal arriving perpendicular to the line of receivers, then a simple summation of the data from each receiver, also called a receiver time series, will suffice to obtain all of the signal energy. In general, the signal is not perpendicular, and the time delays must be removed before the receiver data can be summed up in a process called beamforming.

After beamforming, the detected signals originate primarily from a direction of interest, but strong signals from other directions can still be present, although they will be attenuated in strength by the beamformer. The amount of attenuation applied to signals not in the beamformed direction is determined by the array=s beampattern which describes the receiver's response as a function of the direction of the incident sound waves. The beampattern has two main components. One component is a mainlobe, describing the direction of maximum reception, so that signals arriving from that direction are attenuated very little. The second component is the sidelobes, describing the locus of directions of origin from which the signal is attenuated more. Ideally, the sidelobe response should be zero, so that signals arriving from the sidelobe directions can be completely filtered out of the beam. This is not possible in practice. In reality, the sidelobe response for a given acoustic frequency is determined by the number of receivers in the array and by their spacing. The number of receiver elements is limited by cost, since underwater hardware is expensive and only a small number of elements can be deployed practically. Broadband arrays are designed to operate over a broad range of frequencies, but to do so they need many elements to provide low sidelobe response across all of the desired frequencies. However, this design results also in arrays that have high sidelobes in any individual frequency.

Adaptive beamforming improves the conventional beam response by changing the beampattern sidelobes so that the beam response is lower in the direction of strong unwanted sidelobe signals and higher where there is less interference from unwanted signals. This redistribution reduces the noise received on the beam while preserving the strength of the signals received in the direction of interest, enhancing the detectability of desired signals. The shape and size of the sidelobes is changed by weighting the data from each receiver. For example, for 10 receivers, 10 adaptive weights are used.

Since beampatterns change with frequency, adaptive beamforming must be applied separately to each frequency. This is accomplished for broadband signal applications by applying a Fourier Transform to the time series receiver data, which decomposes the broadband signal into a number of narrowband frequencies for which the beampattern is constant. Adaptive beamforming changes the sidelobe pattern on each narrowband frequency independently by weighting each receiver for each frequency differently. Adapted narrowband frequencies are then recombined to produce a broadband adapted beam.

To change the sidelobe patterns, the adaptive beamformer must first estimate the directions of origin of sidelobe signals. When sample matrix inversion approaches are used, the number of samples across time required to calculate the adaptive weights so that they are within 3 dB of the optimal weights for each narrowband frequency, is two times the number of adaptive weights. These time samples must have the same signal structure, meaning that they must have the same direction of arrival and the same strength for the adaptive weights to be optimal over the whole time period being considered. This becomes problematic in the case of adaptive beamforming for active signals, because these signals change rapidly in time.

One class of active signal is a modulated waveform. Modulated waveforms have a long time duration, in the order of a couple of seconds, but when they are matched filtered, their time duration becomes compressed down to the inverse of their bandwidth, which is generally much less than 1 second. Another class of active signal, known as impulsive sources, have by definition a very short time duration.

As noted above, one would like to have narrowband time samples containing the same signal information that can be obtained from modulated signals only by processing them before matched filtering. This apparent solution leads to more difficulties, however, since the unmatched filtered modulated signals have durations so long that they overlap in time with other arriving signals. This can overload the adaptive beamformer as it attempts to process many more simultaneous signals arriving in the sidelobe than necessary. To avoid overloading the adaptive beamformer one is led to match filter the data first and then apply the adaptive beamformer. This leads to time samples having a changing signal content, because the compressed active signals are so short in duration that they are only present within one or two narrowband samples.

One possible solution is to adapt more rapidly and change the adaptive weights every 1 or 2 narrowband samples. In an effort to adapt faster, techniques like beam based adaptive beamforming and dominant mode rejection have been used. Fundamentally, all these techniques require some amount of time samples with consistent signal content to work optimally. One can also combine narrowband frequency samples for the same time sample and use the same adaptive weight across the narrowband frequencies being used. This approach can only be used over a limited fractional bandwidth, since the beampattern and sidelobes are changing across frequency (though more slowly at higher frequencies than at low frequencies). These techniques will perform some amount of averaging of time samples where the signal content is changing. The result is that the sidelobes will be reduced for the entire averaging time rather than only for the time when active signals are actually present. This will null out the active signals but at the price of raising the sidelobe levels in other directions, increasing the overall noise seen on the beam.

A technique described by Anderson in the paper ("Rejection of a coherent arrival at an array", JASA vol. 45, pp. 406–410, 1969) removes broadband sidelobe signals by beamforming in the direction of the sidelobe signals. This produces a good estimate of the interfering signal, which is then subtracted from the original receiver data, effectively removing it. Beamforming is then done on the filtered receiver data to produce beams in the desired directions and with the sidelobe signal removed. This method determines the direction of the sidelobe interferer manually, only one interferer can be removed, and the data processed does not contain any active signals but only passive signals which are basically continuously present.

SUMMARY OF THE INVENTION

The present invention is directed to a technique for canceling interferer signals from a broadband signal.

The invention described here improves upon Anderson's technique in four important ways. It can be applied to active signals by adapting much faster, while still maintaining the capability to remove passive interferences. The method according to the invention automatically estimates the interference direction using a bearing estimation algorithm instead of requiring manual selection of the direction. Subtraction of the interference beam signal from the receiver data is accomplished with an adaptive FIR (Finite-Impulse-Response) filter, different for each receiver, which adjusts for errors in the bearing estimation and for different receiver responses. The process is repeated using filtered receiver data from the previous iteration until there are no more detectable interferences.

A method consistent with the present invention cancels interferers in broadband sonar using adaptive beamforming, which comprises receiving a phone time series signal from each hydrophone in an array, detecting in a detector a strong signal within the phone time series signal and estimating a bearing of the strong signal. A beam is formed in the direction of the strong signal. This beam is filtered to make its data match each of the hydrophone data better, and then the resulting beams for each hydrophone are subtracted from the corresponding hydrophone data.

As used in the present application, a phone time series is the data being output from each hydrophone receiver, and is also referred to as an element time series. Hydrophone receivers are like underwater microphones that produce a voltage proportional to the acoustic pressure experienced by the hydrophone. The voltage is typically converted to a digital voltage and the resulting digital data across time is called a "time series". A beam time series is the beamformed phone time series data, consisting of a set of digital values extending in time.

The method according to the invention may further include repeated filtering of the filtered phone time series data if another strong signal is detected therein. The process is repeated until there are no signals present that exceed some preset threshold test for detection.

In another embodiment, the invention is a method for canceling an interferer signal from a broadband signal, including detecting the interferer signal in the broadband signal, estimating the bearing of the interferer signal, beamforming in the direction of the interferer signal, and subtracting this interference beam from the broadband signal phone time series data, thereby removing it.

An embodiment of an apparatus consistent with the present invention cancels interferer signals from a broadband signal, and includes an array of receivers each receiving a phone time series signal, a detector for detecting a strong interferer signal and estimating a bearing of the strong interferer signal, and a beamforming computer to generate a beam corresponding to the strong interferer signal. The apparatus further has computing means to generate time delayed and scaled portions of the beam corresponding to each hydrophone, and subtracting the time delayed portion of the beam from the corresponding phone time series to form a filtered phone time series. There are also output means to output the filtered phone time series when the next detected strong interferer has a strength lesser than a preselected threshold value.

It is to be understood that both the foregoing general description and the following detailed description of the invention are exemplary and explanatory, and are intended to provide further explanation of embodiments consistent with the present invention.

BRIEF DESCRIPTION OF THE DRAWINGS

The accompanying drawings which are included to provide further understanding of the invention and are incorporated in and constitute a part of the specification, illustrate one embodiment of the invention, and together with the description serve to explain the principles of the invention. In the drawings.

DETAILED DESCRIPTION

Reference will now be made in detail to embodiments of the invention, examples of which are described in the accompanying specification and illustrated in the accompanying drawings. While the present invention can be broadly applied to the field of signal cancellation using adaptive beamforming techniques, it is especially well suited for use in canceling active interferer signals from a broadband signal received by a sonar array.

A time domain implementation of Anderson's technique for removal of coherent signals arriving on an array of receivers was developed for use with active sonar, with automation in bearing estimation and additional filtering in the subtraction part of the algorithm. No spectral decomposition of the signals is required using this technique. The coherent signals can be either interferer signals, or the signals of interest. This technique has the potential for fast convergence, since there is no covariance matrix estimate needed for the nulling of interferers. The technique removes interferers by forming a beam in the direction of the interferers, and subtracting the resulting beam time series, appropriately aligned, from each of the element time series data channels. In prior applications of the technique, the direction of the beams was manually determined, and the interferers being canceled were limited to passive interferers, requiring only a relatively slow integration time.

In an embodiment consistent with the present invention, the system rapidly cancels broadband interferers present in active broadband signals received by an array of receivers. The system first cancels the strongest interferer, then repeats the process with the next strongest, until a pre-set threshold is reached.

The present application of Anderson's technique with automation in bearing estimation and additional filtering in the subtraction part of the technique is faster than prior applications, and thus can be applied to active sonar and to interferers having a short time period. Prior applications required an extended set of time samples for estimation of the adaptive weights, whereas this technique can operate on a single time sample.

Figure 1:
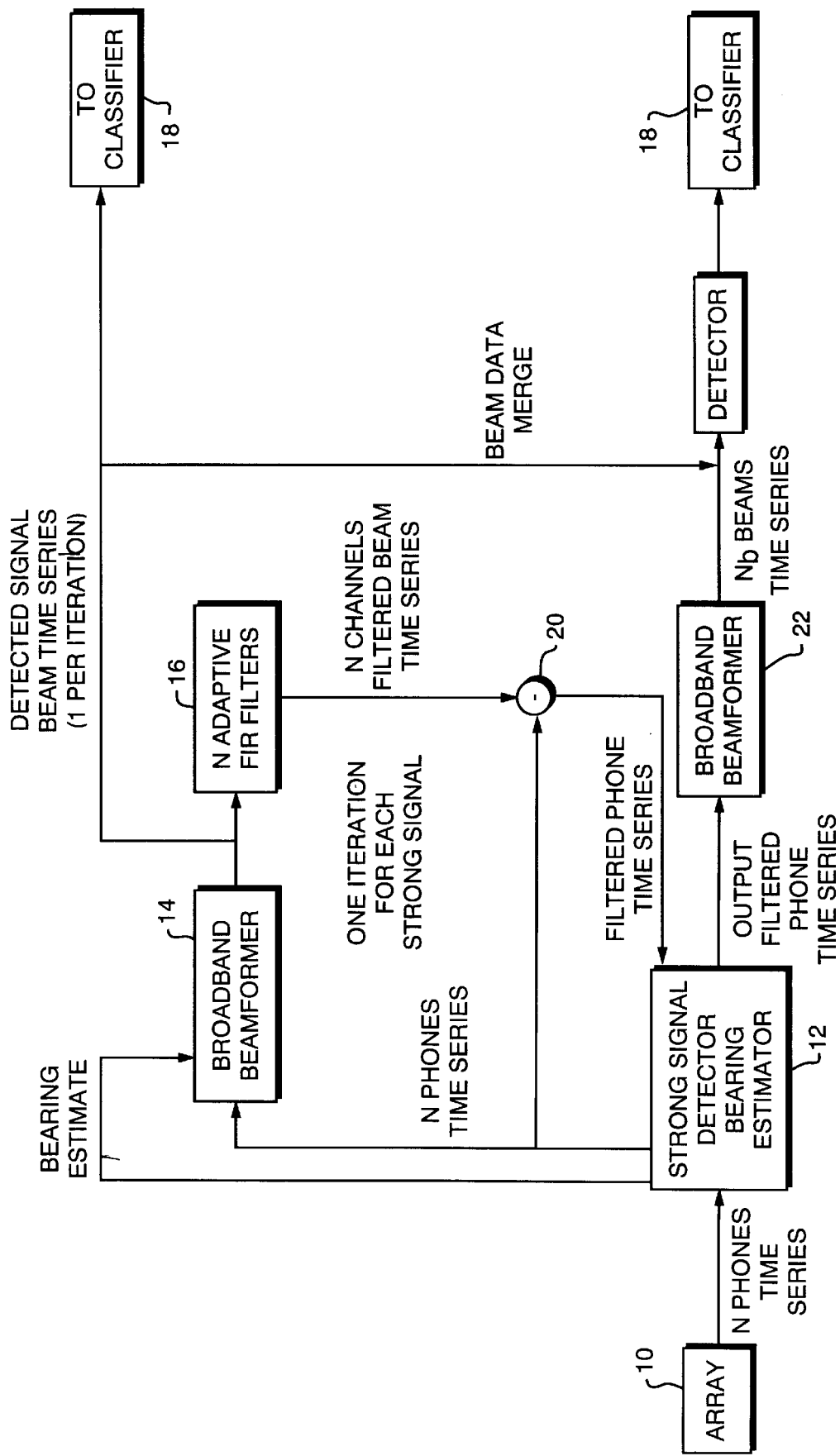
FIG. 1 is a diagrammatical representation of a system, according to one embodiment consistent with of the present invention, for canceling interferers from a broadband signal.

A block diagram of a system for implementing the algorithm is shown in FIG. 1. Interferers are removed in a two stage process that is repeated for each interferer in the data segment being processed. In the first stage, strong interferers are detected and the time delay of arrival of the interferer on each receiver array element, relative to a reference end element is estimated to obtain a bearing. This is carried out by signal detector/bearing estimator 12 of FIG. 1. In the second stage, the element time series data is summed after compensating for the measured time delays to form a "beam" in the direction of the interferer. The beam data is then aligned with each of the elements by delaying the beam data by the inverse of the time delay measured earlier, and is then subtracted from the element data. To further compensate for mismatches between the beam data and the element data, the beam data is also filtered with an adaptive finite impulse response (FIR) filter that is designed to minimize the output power after subtraction. This stage takes place in filter 16 and subtracter 20.

This process is repeated for each interferer in the data. The interference free element data is then conventionally beamformed after filtering. This results in two sets of beam data, the residual beam data formed from the filtered element data and the reference beam data, both of which are kept for detection and classification.

Figure 2:
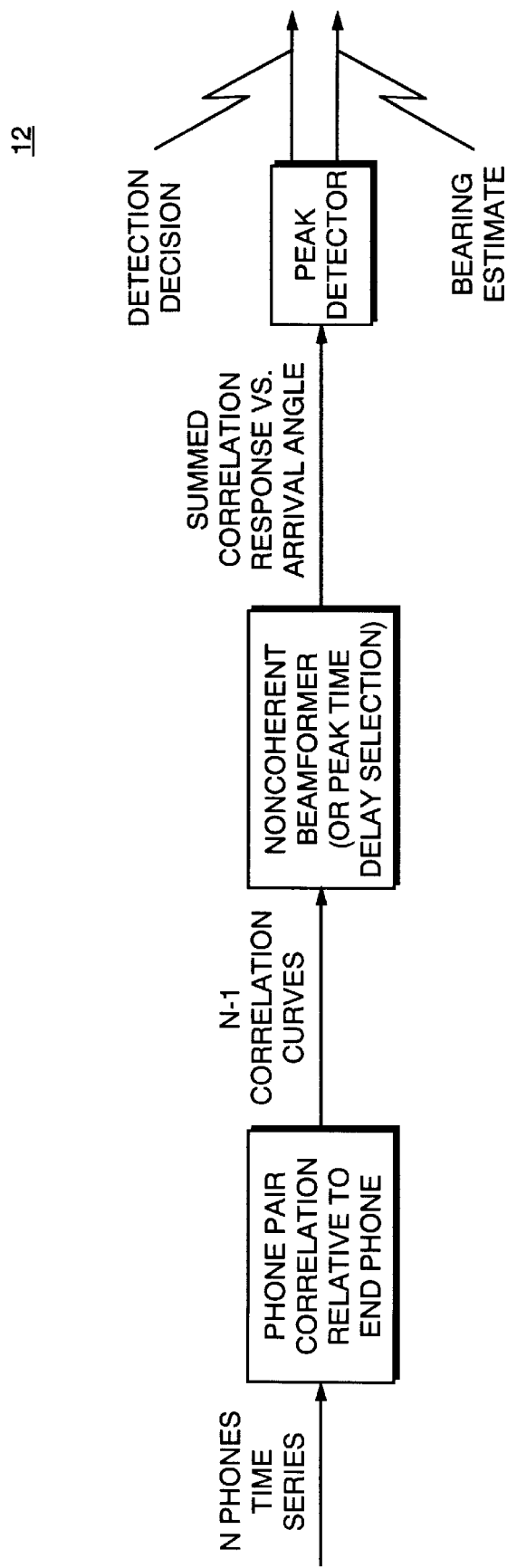
FIG. 2 is a diagrammatical representation of a strong signal detector/bearing estimator shown in FIG. 1.

In an exemplary preferred embodiment, as shown in FIG. 1, a phone time series is received by an array 10 of receiving devices, such as hydrophones, located at different positions. The phone time series is analyzed in a strong signal detector/bearing estimator 12, which computes the bearing of strong signals. (See also description in section A.) The bearing is estimated by correlating each hydrophone with a reference hydrophone, as shown in the first block in FIG. 2. Correlation is a function executed in software resident on a computer, and produces a response as a function of bearing. Correlations will have a large value at a bearing consistent with a strong signal and a small value consistent with noise only. When the correlations from each hydrophone pair are summed, as shown in FIG. 2, block 2, the result is a correlation response as a function of bearing that can better detect the presence of strong signals. This correlation response is compared to a threshold value, as seen in FIG. 2, block 3. The highest value exceeding the threshold indicates a strong signal detection, and the corresponding bearing being is then sent to the interference beamformer. FIG. 2 shows a detailed schematic of the operation of detector/bearing estimator 12.

The bearing estimate and phone time series data is then passed to a broadband beamformer 14, as shown in FIG. 1, where a detected signal beam time series is generated to cancel the detected strong signal from the phone time series. The broadband beamformer 14 is accomplished with software resident on a computer. Since at this point it is not known whether the detected signal is an interferer or a signal of interest, the detected signal beam time series is routed to a classifier 18 to be classified. Classifier 18 can be an electronic computer with a memory storing representations of known sounds and a processor for comparing those representations to the detected signal. The detected signal beam time series is also routed to an adaptive FIR filter 16, where the appropriate delay times associated with each receiver of array 10 are applied to the signal, and its amplitude is reduced to match that of the phone time series. Time delays are computed from the estimated interferer bearing and are the negative of the beamforming delays that were applied to each of the phone time series to produce the interferer beam. The resulting reference beam signals are subtracted from the detected signal beam time series in subtracter 20, which is also preferably an electronic computer. Finally, when a sufficient number of strong signals have been canceled, the resulting output filtered phone time series signal is output through a beamformer 22, and is classified by classifier 18.

The adaptation rate for the system is determined by the amount of time needed to estimate the bearing of interferers. For active returns, the most time one can use is the (compressed) pulse duration plus the travel time across the array, as there is no information outside of this time window. In an exemplary embodiment consistent with the invention, the data can be segmented into 50% overlapped blocks of duration equal to the travel time across the array and the pulse duration. For passive interferers, the integration time could be longer and still be acceptable, but in this embodiment, according to the invention, there are no provisions in the system to distinguish between applications to signals requiring a fast and a slower integration time. The following sections will describe in detail aspects of the invention.

A. Interferer Bearing Estimation

In order to place a null in the direction of the interferer, a beam is first formed in the direction of the interferer in strong signal detector/bearing estimator 12. The direction is unknown a priori and so has to be estimated. The technique chosen to obtain the estimate is broadband cross correlation of each element with a reference end element which can be the last element to receive the interferer.

This technique yields a reception time delay of a signal between receivers of array 10 compared to a reference end receiver, so that the peak location of the delay gives the estimated time delay between receiver channels. Alternatively, one could choose to conventionally beamform the data, and then pick the beam having the peak response (assuming they are close enough together). However, the latter approach assumes the receiver or hydrophone locations are known accurately, which is not always the case, and that the signal is a plane wave in the far field. Since the interferer signal is strong, the signal to noise ratio is high enough to perform an element based processing and determine the actual time delays between all of the channels for a particular data segment. Element level correlation processing does not assume knowledge of the exact hydrophone positions, or that the signal arriving is a plane wave. In utilizing this approach, the minimum measurement time for the cross correlation estimate should be the signal duration plus the travel time across the array 10, so that all the correlation will take into account the complete signal data received by all of the hydrophones in array 10.

B. Interference Cancellation

Once the interferer time delays across the hydrophones have been determined in the bearing estimation step, the interference is removed. The element time series data is first aligned by delaying each element by its measured interference delay relative to the reference element. The element time series data is then summed, resulting in a beam formed in the direction of the interferer. The beam data is subtracted from each of the phone data as follows. Beam data is delayed by the negative of the beamforming delay for each phone, and is passed through an adaptive FIR (Finite-Impulse-Response) filter which is designed to make the beam data more like the phone data, and thus enhance the subtraction of the beam data from the phone data, which is the final step.

Figure 3:
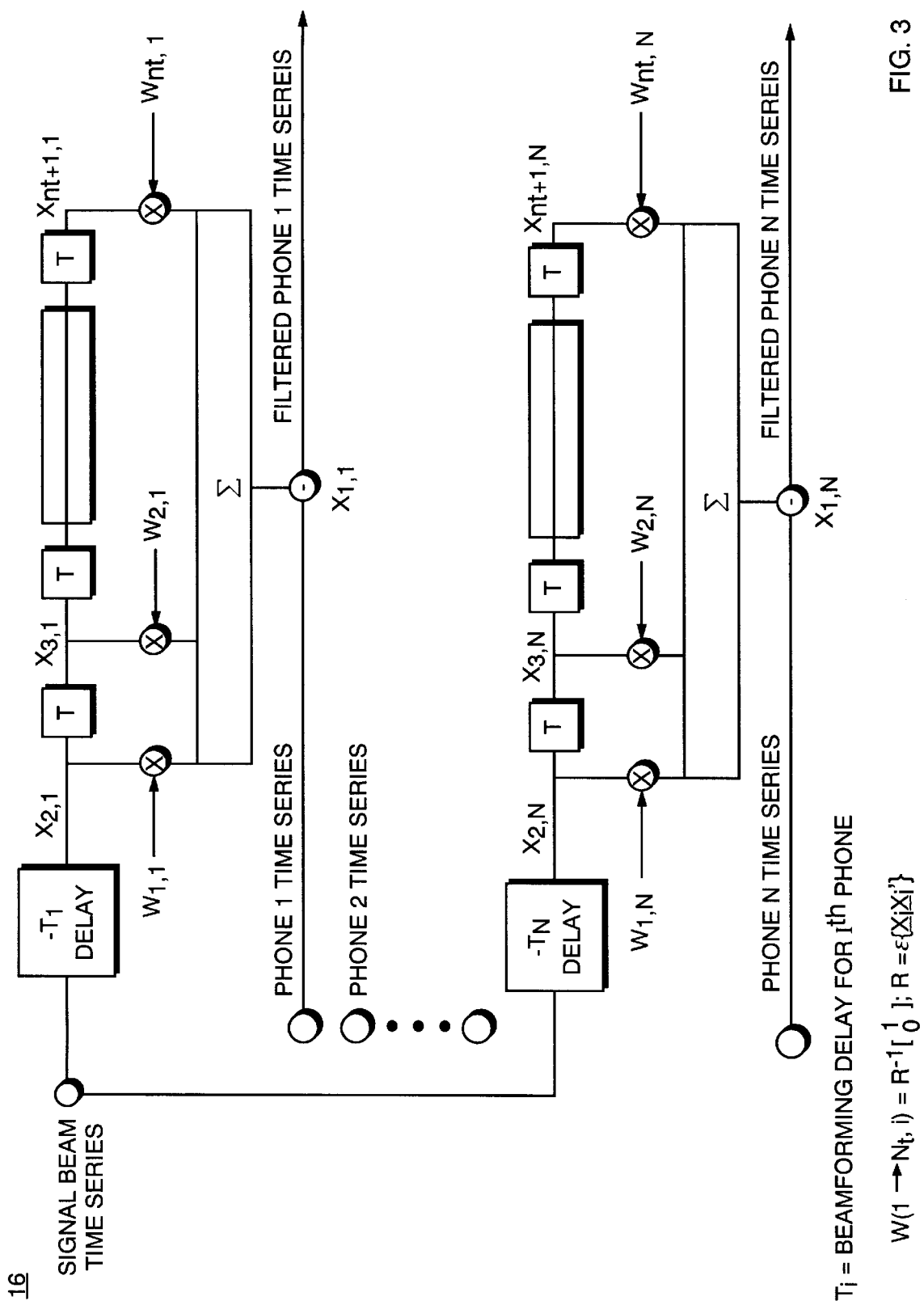
FIG. 3 is a diagrammatical representation of an adaptive FIR filter shown in FIG. 1.

The FIR filter is needed to account for real world effects like variations in the phone responses and decorrelation of the signal across the array, which increases with distance from the reference phone. Time delay estimation or interferer bearing estimation is subject to some errors as well. FIG. 3 shows the block diagram for the adaptive FIR filter. The input beam data X is delayed by integer samples T, multiplied by the adaptive weights W and summed to produce the filtered beam, which is subtracted from the phone data. The weights are calculated by minimizing the power of the filtered phone time series, subject to the constraint that signals on the phone data channel not appearing on the beam data channel are preserved. (W=[1 0]=1 in vector notation.) FIG. 3 shows the resulting system for determining the weights as the inverse of the covariance matrix of the beam data X, times the vector of zeros with the first element equaling 1. The number of weights W used is typically less than 10.

It should be noted that this algorithm is not sensitive to correlations between signals as in other traditional adaptive algorithms, since the interferer is estimated as a beam time series and then is subtracted from a limited time delay window on the element time series data. Thus there is no cancellation of the desired signal if that signal is correlated with another return signal.

C. Iteration Process

The process described above results in cancellation of the strongest interferer present in the signal. Generally, there will be multiple strong interferers present, so the process described above needs to be repeated for each interferer. If after the initial interference cancellation step there is still sizable energy in the signal, as determined in strong signal detector/bearing estimator 12, the residual element time series is input back into the bearing estimation stage and the process is repeated until there are no more strong interferers left in the signal. Whether the process is repeated is determined by setting a threshold on the correlation output so that the iterations stop if the summed correlation does not exceed the predetermined threshold. An advantage of the iterative process is that the number of iterations is data dependent so that there are only about as many iterations as interferers. The process, according to the invention, does not have to be repeated a predetermined number of times corresponding to the estimated number of necessary degrees of freedom and, therefore, avoids wasting computing resources.

While iterating on the interferer energy, it is entirely possible that the return of interest will be detected as one of the loud strong interferer signals, and subsequently canceled from the element time series. In the event that this happens, the target return will be contained in the reference beam itself, also referred to as the detected signal beam time series, rather than in the remaining filtered phone time series signal. This is actually advantageous as it avoids signal loss due to the signal being away from the mainlobe axis. Normally, arrays are processed by beamforming in a fixed number of directions. The beam mainlobes are overlapped but there is still some signal degradation when the signal falls between beam directions. For this algorithm, strong signals (and interferers) have a beam pointed directly at them, so there is no loss because the signal is always on the mainlobe axis.

The scenario of a strong signal being detected underscores the necessity of further processing the "interference" beams since they may actually contain the signal(s) of interest. These beams are passed to the classification stage (18) to determine if they are of interest.

It is possible that the bearing computation step results in an inaccurate estimate, such that total cancellation of the interferer signal is not achieved. In that case, the iteration is a useful start, and multiple iterations can be used to improve on the rejection of the interferer. If the accuracy of the bearing estimate is so poor that there is no appreciable rejection of the interferer after each iteration, and the same interferer is detected each time resulting in the same bearing estimate being computed each successive time, the algorithm could become stuck in an infinite loop. To prevent this, there is a failsafe feature that prevents the use of the same bearing in successive iteration. Instead, the bearing is perturbed about the estimated bearing. This has the effect of broadening the null generated to cancel the interferer and helps to effectively remove the troublesome interference.

D. Results

Figure 4:
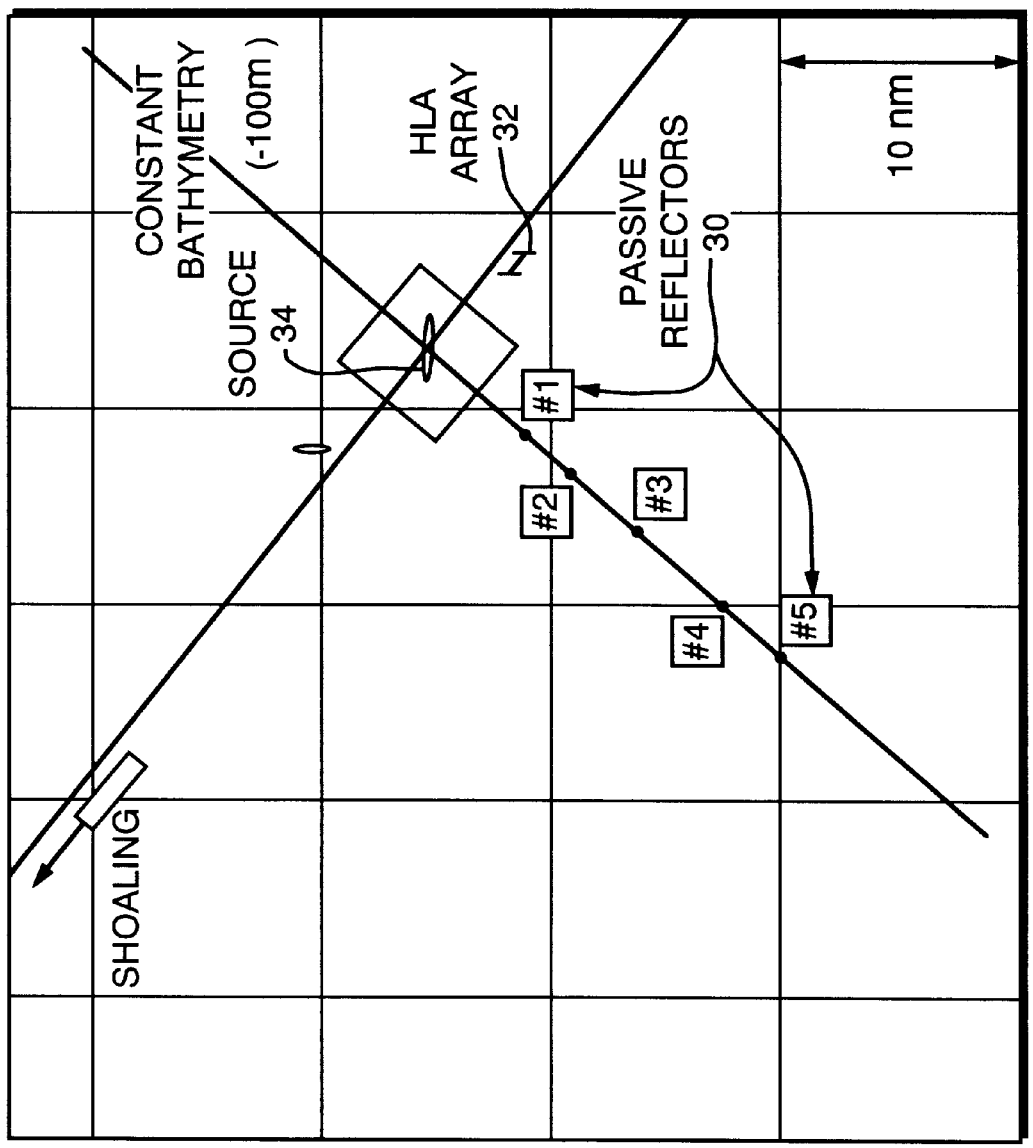
FIG. 4 is a diagram showing the element used to test an embodiment consistent with the present invention.

The system described above was applied to impulsive sonar data received on a bottomed array as shown in FIG. 4. Passive reflector targets 30 were placed nearby the bottomed array 32. A source 34 was used. The active adaptive algorithm was applied to a subset of the data containing a passive reflector echo, noise from 3 nearby ships, and active echo interference that was time coincident with the passive reflector echo. The receiver array used had a broadband sidelobe response that leveled out at 10 dB down from the peak so that noticeable energy from the interferences leaked into the passive reflector beam. For the purposes of bearing estimation, data was segmented into 50% overlapped blocks of 2 second duration, which corresponds to the pulse duration plus the travel time across the array. After 4 iterations of the active adaptive algorithm, the interferences were fully removed from the passive reflector beam so that the passive reflector echo had a signal to noise ratio 6 dB higher than with conventional beamforming.

The system for processing broadband active sonar data and canceling interferer signals according to the invention has demonstrated its ability to null out active as well as passive interferers. Convergence time of the system corresponds approximately to the pulse duration plus the travel time across the array of a signal.

It will be apparent to those skilled in the art that there are modifications and variations that can be made in the structure and method of the present invention, without departing from the spirit or scope of the invention. Thus, it is intended that the present invention covers the modifications and variations of this invention provided they come within the scope of the appended claims and their equivalents.

What is claimed is:

1. A method for cancelling interferers in broadband sonar using adaptive beamforming comprising:

receiving a receiver output voltage that is proportional to a pressure experienced by said receiver with such output voltage over time forming a phone time series signal from an array of receivers, each receiver of the array receiving an individual phone signal;

detecting a strong signal within the phone time series signal;

estimating a bearing of the strong signal;

beamforming a detected signal beam time series embodying the phone time series signal and the bearing;

digitally filtering the detected signal beam time series to produce filtered reference beam signals, the filtered reference beam signals corresponding to receivers of the array; and subtracting for each receiver of the array the filtered reference beam signal from the corresponding individual phone signal to obtain a filtered phone time series signal.

2. The method of claim 1, further comprising:

updating the phone time series signal to equal the filtered phone time series signal;

repeating the detecting through combining steps to compute new filtered phone time series signal; and performing one of generating an output filtered phone time series signal when a strong signal of greater strength than a threshold value cannot be detected, and repeating the updating through combining steps when a strong signal of greater strength than a threshold value can be detected.

3. The method according to claim 1, further comprising the step of classifying in a classifier computer the detected signal beam time series.

4. The method according to claim 1, further comprising the steps of:

forming a broadband output beam from the output filtered phone times series;

detecting an output strong signal from the broadband output beam; and classifying the output strong signal in a classifier computer.

5. The method according to claim 1, wherein the estimating of a bearing comprises:

selecting a signal portion of the phone time series signal;

detecting arrival of the signal portion at each of the receivers;

measuring a peak arrival time difference of the signal portion between pairs of receivers relative to an end receiver; and estimating the bearing from the peak arrival time difference and arrival time to the end receiver.

6. The method according to claim 1, wherein the phone time series signal comprises passive signals.

7. The method according to claim 1, wherein the phone time series signal comprises active sonar signals.

8. The method according to claim 1, wherein the detected signal beam time series embodying the strong signal is added to the output filtered phone time series.

9. The method according to claim 1, wherein the detected signal beam time series is filtered to obtain a filtered reference beam signal by applying a weighted time delay corresponding to each of the receivers to portions of the detected signal beam time series.

10. The method according to claim 1, further comprising perturbing the estimated bearing of the strong signal by adding a perturbation value to the estimated bearing.

11. An apparatus for cancelling interferer signals from a broadband signal, comprising:

an array of receivers each receiver having an output voltage that is proportional to the pressure experienced by said receiver with such output voltage over time forming a phone time series signal;

a detector for detecting a strong interferer signal and estimating a bearing of the strong interferer signal;

a beamforming computer to generate a broadband beam corresponding to the strong interferer signal;

digital filtering means to generate time delayed portions of the broadband beam corresponding to each receiver, and computing means for subtracting the time delayed portion of the broadband beam from the corresponding phone time series signal to form a filtered phone time series signal, and output means to output the filtered phone time series signal when the strong interferer has a strength lesser than a pre-determined value.

12. The apparatus according to claim 11, wherein the detecting means comprise computing means to correlate pairs of phone time series signals and sum the resulting correlation as a function of arrival angle, such that peaks in the correlation exceeding the pre-determined value are considered detections, and output means to output an arrival angle at which the peak occurs.

13. The apparatus according to claim 11, wherein the detecting means comprise a beamforming computer to process the phone time series signal at a number of arrival angles, to consider detection beam energy that exceeds the predetermined value, and to output an arrival angle most exceeding the predetermined value.

14. The apparatus according to claim 11, wherein the digital filtering means comprise a finite-impulse-response (FIR) filter calculating corresponding FIR weights to minimize output of the filtered phone time series signal while preserving data present only in the phone time series signal, such that a different set of FIR weights is associated with each receiver.

* * * * *